United States Patent
Kuan et al.

(10) Patent No.: US 10,795,518 B2
(45) Date of Patent: Oct. 6, 2020

(54) BASELINE UPDATE FOR INPUT OBJECT DETECTION

(71) Applicant: Synaptics Incorporated, San Jose, CA (US)

(72) Inventors: Katherine Kuan, San Jose, CA (US); Nickolas Fotopoulos, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/174,843

(22) Filed: Oct. 30, 2018

(65) Prior Publication Data

US 2020/0133412 A1    Apr. 30, 2020

(51) Int. Cl.
*G06F 3/045*   (2006.01)
*G06F 3/041*   (2006.01)
*G06F 3/044*   (2006.01)

(52) U.S. Cl.
CPC ............ *G06F 3/044* (2013.01); *G06F 3/0418* (2013.01); *G06F 2203/04101* (2013.01); *G06F 2203/04106* (2013.01)

(58) Field of Classification Search
CPC ....... G06F 3/044; G06F 3/0418; G06F 3/0416
See application file for complete search history.

(56) References Cited

U.S. PATENT DOCUMENTS

| | | | |
|---|---|---|---|
| 2006/0227115 A1 | 10/2006 | Fry | |
| 2008/0158176 A1 | 7/2008 | Land et al. | |
| 2010/0292945 A1* | 11/2010 | Reynolds | G06F 3/044 702/65 |
| 2012/0043976 A1* | 2/2012 | Bokma | H03K 17/955 324/679 |
| 2012/0283972 A1 | 11/2012 | Vandermeijden | |
| 2014/0022206 A1 | 1/2014 | van de Waerdt | |
| 2014/0198059 A1 | 7/2014 | Gu et al. | |
| 2014/0278173 A1 | 9/2014 | Elia et al. | |
| 2015/0109243 A1 | 4/2015 | Jun et al. | |
| 2015/0145835 A1 | 5/2015 | Vandermeijden | |
| 2015/0268764 A1* | 9/2015 | Miyahara | G06F 3/044 345/174 |
| 2016/0231860 A1 | 8/2016 | Elia | |
| 2016/0282980 A1 | 9/2016 | Chintalapoodi et al. | |
| 2016/0357344 A1* | 12/2016 | Benbasat | G06F 3/0418 |

* cited by examiner

*Primary Examiner* — Nan-Ying Yang
(74) *Attorney, Agent, or Firm* — Ferguson Braswell Fraser Kubasta PC (57) ABSTRACT

Baseline update for input object detection includes determining raw measurements from resulting signals acquired for a sensing region, obtaining a masked region of the sensing region based on the raw measurements, and generating a baseline update value using a subset of the raw measurements corresponding to an unmasked region. A baseline value of the masked region is updated using the baseline update value to obtain an updated baseline. A location of an input object is detected using the updated baseline.

17 Claims, 7 Drawing Sheets

BASELINE UPDATE FOR INPUT OBJECT DETECTION

FIELD OF THE INVENTION

This invention generally relates to electronic devices.

BACKGROUND

Input devices, including proximity sensor devices (i.e., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (i.e., opaque touchpads integrated in, or peripheral to, notebook or desktop computers). Proximity sensor devices are also often used in smaller computing systems (i.e., touch screens integrated in cellular phones).

Proximity sensor devices may use a baseline estimate in order to determine the location of input objects in the sensing region. The baseline is an estimate of what would be measured when an input object is not present in the sensing region. For proximity sensor devices that use a baseline estimate, accurate detection of input objects is dependent on having an accurate baseline.

SUMMARY

In general, in one aspect, one or more embodiments relate to a processing system that includes sensor circuitry and processing circuitry. The sensor circuitry is coupled to sensor electrodes, and is configured to drive the sensor electrodes, and acquire, from the sensor electrodes and based on driving the sensor electrodes, resulting signals of a sensing region. The processing circuitry is configured to determine first raw measurements from the resulting signals, obtain a masked region of the sensing region based on the first raw measurements, and generate a baseline update value using a subset of the first raw measurements corresponding to an unmasked region. The processing circuitry is further configured to update a baseline value of the masked region using the baseline update value to obtain an updated baseline, and detect a location of an input object using the updated baseline.

In general, in one aspect, one or more embodiments relate to a method that includes determining first raw measurements from resulting signals acquired for a sensing region, obtaining a masked region of the sensing region based on the first raw measurements, generating a baseline update value using a subset of the first raw measurements corresponding to an unmasked region, and updating a baseline value of the masked region using the baseline update value to obtain an updated baseline. The method further includes detecting a location of an input object using the updated baseline.

In general, in one aspect, one or more embodiments relate to an input device that includes sensor electrodes, and a processing system operatively connected to the sensor electrodes. The processing system is configured to drive the sensor electrodes, acquire, from the sensor electrodes and based on driving the sensor electrodes, resulting signals of a sensing region. The processing system is further configured to determine raw measurements from the resulting signals, obtain a masked region of the sensing region based on the first raw measurements, and generate a baseline update value using a subset of the first raw measurements corresponding to an unmasked region. The processing system is further configured to update a baseline value of the masked region using the baseline update value to obtain an updated baseline, and detect a location of an input object using the updated baseline.

Other aspects of the invention will be apparent from the following description and the appended claims.

BRIEF DESCRIPTION OF DRAWINGS

Exemplary embodiments will be described in conjunction with the appended drawings, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (i.e., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved detectability of input objects. The input device operates by using sensor electrodes that detect changes in signal. To determine an amount of change, a baseline is used. The baseline is an estimate of the measurement of the signal if an input object were not present in the sensing region. The signal if an input object were not present may be referred to as a background signal. The background signal may change over time, such as because of temperature changes or because of changes in a displayed image, which might change the background capacitance, and other environmental or internal effects. For persistent changes in the background signal, the baseline should be modified in order to be an accurate estimate. In particular, an inaccurate baseline may cause actual input objects not to be detected and hallucinated input objects (i.e., input objects that do not exist) to be detected.

Thus, by accounting for the baseline when the baseline is accurate, the input device is able to detect and report each actual input object that is present. Because the background signal may change, the baseline estimate should also change in order to accurately reflect the background signal.

However, when one or more input objects, actual or hallucinated, are detected in the sensing region, updating the baseline may be a challenge. For example, updating the baseline without accounting for current input objects may cause the input device to incorrectly detect new actual input objects at the location of the current input objects. Specifically, with a baseline that has some input object signal absorbed into it, the amplitude and shape of a signal at that location will be misestimated, possibly causing a true object to not be detected, incorrect position estimate, or detection of a single object as multiple objects. Further, correctly updating the baseline without updating at detected locations of input objects may leave a localized distortion in the baseline estimate. Counter-intuitively, the selective correction of only updating the locations without detected objects can cause baseline distortions that are more misleading than leaving the entire baseline estimate uncorrected. In either scenario of including or excluding detected input object locations in updating the baseline, the input device may falsely detect or fail to detect input objects and report incorrect information.

One or more embodiments are directed to updating the baseline by determining a baseline update value from locations in which an input object is not detected as being present and applying the baseline update value to locations in which the input object is detected as being present. By having a more accurate baseline, one or more embodiments are more accurate in detecting input objects and reporting positional information.

Figure 1:
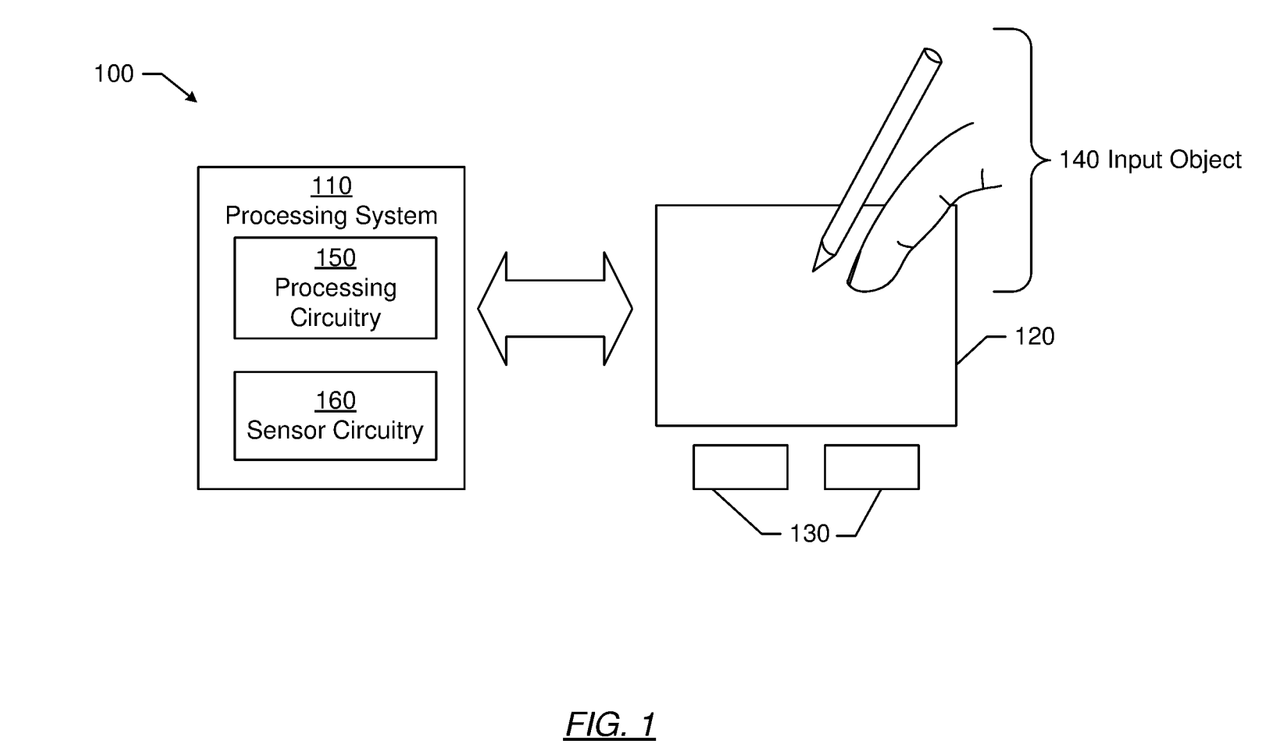
FIG. 1 is a block diagram of an example system that includes an input device in accordance with an embodiment of the disclosure.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (i.e., desktop computers, laptop computers, netbook computers, tablets, web browsers, e-book readers, and personal digital assistants (PDAs)), composite input devices (i.e., physical keyboards, joysticks, and key switches), data input devices (i.e., remote controls and mice), data output devices (i.e., display screens and printers), remote terminals, kiosks, video game machines (i.e., video game consoles, portable gaming devices, and the like), communication devices (i.e., cellular phones, such as smart phones), and media devices (i.e., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (i.e., provided by one or more input objects (140)). The sizes, shapes, and locations of particular sensing regions may vary depending on actual implementations.

In some embodiments, the sensing region (120) extends from a surface of the input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the input device (100), contact with an input surface (i.e. a touch surface) of the input device (100), contact with an input surface of the input device (100) coupled with some amount of applied force or pressure, and/or a combination thereof.

In various embodiments, input surfaces may be provided by surfaces of a housing of the input device (100) within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. An image is a collection of measurements of the sensing region where each measurement corresponds to a particular position on the sensing region. For example, in capacitive implementation, a capacitive image has a capacitive measurement for each location of the sensing region. Some implementations are configured to use and/or provide projections of input along particular axes or planes. A projection is an aggregation of measurements along the axis or plane. For example, a projection may have multiple values, where each value is along a first axis, and each value is a sum of the measurements along a second axis. By way of a more specific example, a column projection may have a single value for each row of a column, where each single value corresponds to a sum of the measurement values for the row. Further, some implementations may be configured to use and/or provide a combination of one or more images and one or more projections.

The input device (100) may utilize various sensing technologies to detect user input. Example sending technologies may include resistive, inductive, capacitive, elastive, magnetic, acoustic, ultrasonic, and optical sensing technologies. In some embodiments, the input device (100) may include one or more sensing elements configured to implement the various sensing technologies.

In some embodiments, the input device (100) may implement resistive sensing technologies to detect user input. For example, the sensing region (120) may be formed by a flexible and conductive first layer separated by one or more spacer elements from a conductive second layer. The sensing region (120) may detect user input by creating one or more voltage gradients are created across the layers and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information of the detected inputs.

In other embodiments, the input device (100) may utilize inductive sensing technologies to detect user inputs. For example, the sensing region (120) may include one or more sensing elements configured to pick up loop currents induced by a resonating coil or pair of coils. The input device (100) may then detect user input based on a combination of the magnitude, phase, and/or frequency of the currents. The characteristics of the loop currents may further be used to determine positional information about the detected inputs.

In some embodiments, the input device (100) may utilize capacitive sensing technologies to detect user input. For example, the sensing region (120) may input one or more capacitive sensing elements (i.e., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self-capacitance" (also referred to as "absolute capacitance") and/or mutual capacitance (Also referred to as "transcapacitance"). Absolute capacitance sensing methods detect changes in the capacitive coupling between sensor electrodes and an input object. Absolute capacitance sensing measures the self-capacitance of the sensor electrode, where the self-capacitance is the amount of electric charge that must be added to a sensor electrode to raise the sensor electrode's electric potential by one unit (i.e., one volt). The self-capacitance of the sensor electrode changes when an input object is proximate to the sensor electrode. For example, an input object near the sensor electrodes may alter the electric field near the sensor electrodes, thus changing the measured capacitive coupling. In some embodiments, the input device (100) may implement by modulating sensor electrodes with respect to a reference voltage (i.e., system ground), and detecting the capacitive coupling between the sensor electrodes and input objects. The reference voltage may be a substantially constant voltage, a varying voltage, or corresponds to a system ground. Measurements acquired using absolute capacitance sensing methods may be referred to as absolute capacitive measurements.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (i.e., system ground) to transmit transmitter signals while receiver sensor electrodes may be held at a substantially constant voltage relative to the reference voltage to receive resulting signals. The reference voltage may be a substantially constant voltage or may be system ground. The resulting signal may be affected by environmental interference (i.e., other electromagnetic signals) as well as input objects in contact with, or in close proximity to, the sensor electrodes. The interference may be referred to as noise. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

The processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may be implemented in hardware, firmware, software, or a combination thereof. In some embodiments, the processing system (110) may include processing circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only processing circuitry (150) and sensor circuitry (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (i.e. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background signal of the sensing region. Each sensing element may have a corresponding individual value in the baseline. As yet further examples, the processing system (110) may determine positional information, recognize inputs as commands, recognize handwriting, and the like.

A raw measurement is a measurement of signals from the sensing region using sensor electrodes and prior to accounting for a baseline. Raw measurements may be the exact measurement prior to any processing or include some level of preprocessing. For example, the raw measurement values may be preprocessed using spatial filtering. Spatial filtering filters the measurements based on neighboring measurements. Additionally, multiple identical or non-identical measurements of the signals may be acquired for the same pixel for the same sensing frame and combined to create the raw measurement value for the pixel.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While many embodiments are described in the context of a fully-functioning apparatus, the mechanisms of are capable of being distributed as a program product (i.e., software) in a variety of forms. For example, the mechanisms of the disclosure may be implemented and distributed as a software program on information-bearing media that are readable by electronic processors (i.e., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (i.e., random access memory (RAM), cache memory, flash memory, etc.), one or more storage device(s) (i.e., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or microcore of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
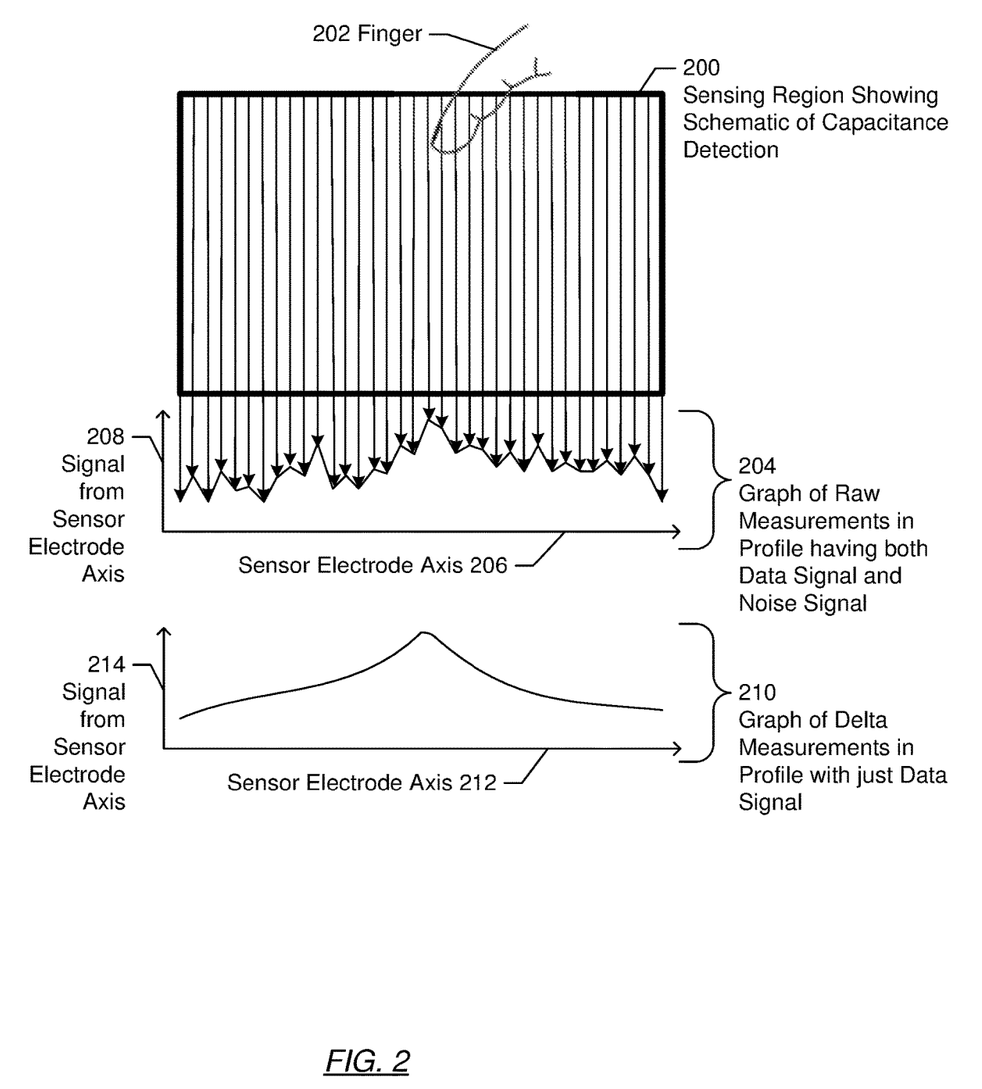
FIG. 2 is a block diagram of an example sensing region showing example input in accordance with an embodiment of the disclosure.

As described above, one or more embodiments are directed to a baseline updating technique. FIG. 2 shows an example describing how baseline is used in one or more embodiments of the invention. The example discussed below is for example purposes only and not intended to limit the scope of the invention. FIG. 2 shows sensing region (200) showing a schematic of capacitance detection along the x-axis. Specifically, the sensing region (200) is shown as the box with the dark border. A finger (202) is an input object in the sensing region. Although not specifically shown in FIG. 2, consider the scenario in which the finger is in the above surface sensing region rather than physically touching the input surface.

In the example, raw measurement values corresponding to the resulting signals received with each of the thirty-six sensor electrodes along the x-axis, the raw measurement values represent the amount of absolute capacitance detected across the entire column as shown by the lines on the sensing region (200). The number of sensor electrodes is only for example purposes. More or fewer sensor electrodes may exist without departing from the scope of the invention. For absolute capacitive sensing, each sensor electrode corresponds to a profile pixel. A profile pixel is a smallest unit in the profile for which a single measurement may be acquired. A profile pixel has a defined immobile position based on the location of the corresponding sensor electrode.

The raw measurement values are graphed on the graph of the profile having both data signal and noise signal (204). Specifically, the x-axis of the graph (206) corresponds to the sensor electrode and the y-axis of the graph corresponds to value of the raw measurement value (i.e., the value of the signal from the sensor electrode) (208). As shown, the raw measurement value has both a data signal and a noise signal. The data signal is the portion of the signal corresponding to the input object (i.e., finger (202) in FIG. 2) while the noise signal is the background noise.

Below the graph (204) of the profile having both data signal and noise signal is a graph of a profile having just data signal (i.e., the noise portion of the signal is removed) (210). Similar to the graph (204), the x-axis of the graph (212) corresponds to the sensor electrode and the y-axis of the graph corresponds to value of the delta value (i.e., the value of the signal from the sensor electrode with just data signal) (214). The graph (210) is acquired by, for each profile pixel in the profile, obtaining the difference between the raw measurement value corresponding to the profile pixel and the baseline value corresponding to the profile pixel. The result is the delta value for the profile pixel.

As shown in FIG. 2, the raw measurements include much noise as evident by the various peaks in the graph (204) as compared to graph (210) even though only one input object is in the sensing region. By accounting for the baseline when the baseline is accurate, the input device is able to identify the location of the input object.

Figure 3:
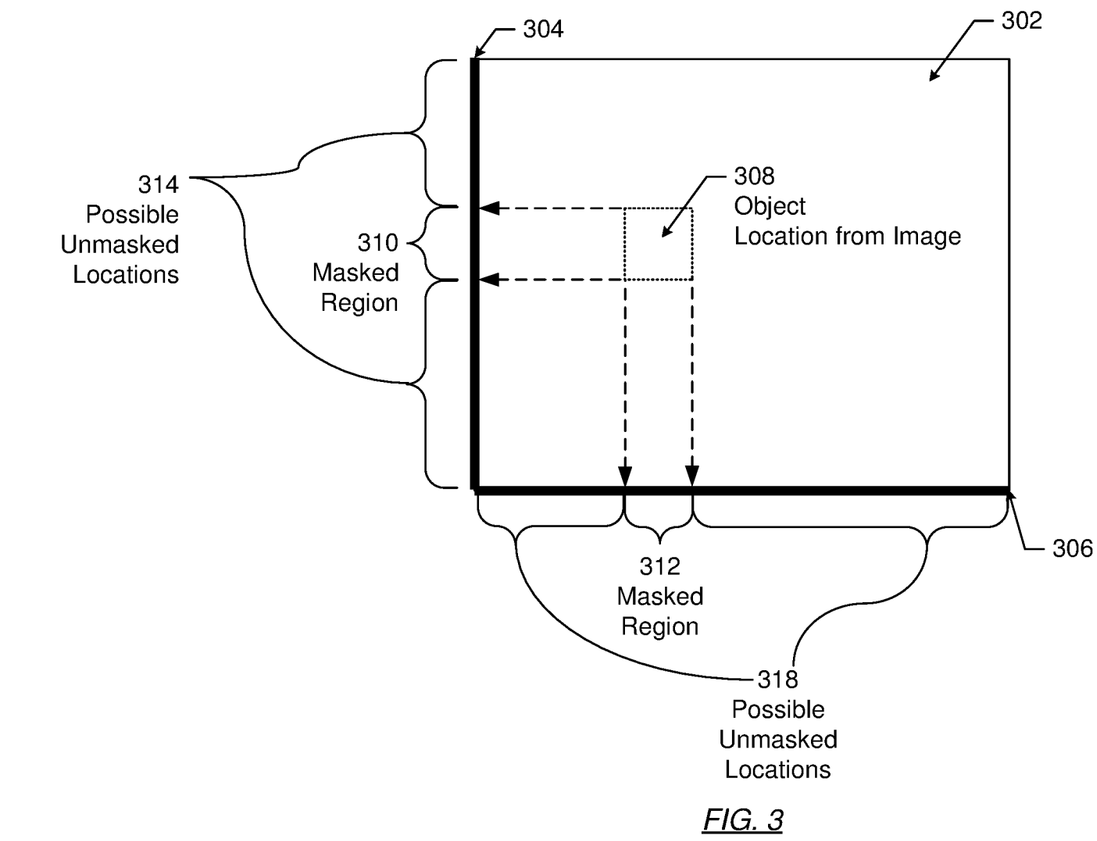
FIG. 3 is a block diagram of an example sensing region showing an example input object location in accordance with an embodiment of the disclosure.

FIG. 3 shows a block diagram of an example system in accordance with one or more embodiments of the invention. In particular, FIG. 3 shows a logical diagram of the sensing region. The sensing region may be partitioned into image pixels. Each image pixel may correspond to an intersection between transmitter electrodes and receiver electrodes. In other words, an image pixel is a smallest immobile unit of the sensing region for which a single measurement may be acquired. An image pixel has a defined position based on the intersection between the corresponding electrodes.

As shown in FIG. 3, a capacitive image (302) is an image of the sensing region that is obtained capacitively. In other words, a capacitive image (302) is a collection of measurements that span the sensing region in accordance with one or more embodiments of the invention. In one or more embodiments of the invention, a measurement may exist in the capacitive image (302) for each image pixel of the sensing region. The capacitive image (302) may be obtained using transcapacitive sensing.

From the capacitive image (302), one or more input object locations (308) may be determined. In one or more embodiments of the invention, a profile (i.e., profile Y pixels (304), profile X pixels (306)) of the sensing region is a collection of measurements along an axis of the sensing region. In one or more embodiments of the invention, profiles may be obtained using absolute capacitance sensing in which the same sensor electrodes receive resulting signals while being modulated with sensing signals (absolute capacitive signals or modulated signals). A profile may be obtained along each axis, or only on a subset of one or more axes. As described above in reference to FIG. 2, profiles may be divided into profile pixels.

In one or more embodiments of the invention, a profile may be divided into regions. The regions are non-overlapping. Further, the combination of regions may or may not span a profile. The regions are masked region (i.e., masked region (310), masked region (312)) and unmasked regions.

The masked regions corresponds to possible locations of the input object. In FIG. 3, the masked region (312) is the object location from the image (308) projected onto the profile X pixels (306). Likewise, the masked region (310) is the object location from the image (308) projected onto the profile Y pixels (304). The masked region may or may not be contiguous.

The unmasked regions include at least a subset of the possible unmasked locations (i.e., possible unmasked locations (314), possible unmasked locations (318)) in FIG. 3. An unmasked region is a region that is determined not to have an input object. The unmasked region may or may not be contiguous. While the detection of the object location in the image (302) is determined as a possible location of an input object in the profiles, other possible locations may exist. Thus, portions of the possible unmasked locations may be changed to part of the masked region based on further computations.

Continuing with the discussion of FIG. 3, multiple baselines exist and are maintained. Specifically, an individual baseline exists for the profile X pixels (306) and the profile Y pixels (304). Further, an individual baseline exists for the capacitive image (302). Each baseline corresponds to the estimation of the background signal as detected using the corresponding sensing method. Thus, the baseline of the profile X pixels (306) corresponds to the interference when absolute capacitance sensing is using along the X axis. The baseline of the profile X pixels (306) has an individual baseline value for each profile pixel along the X axis. The baseline of the profile Y pixels (304) corresponds to the interference when absolute capacitance sensing is using along the Y axis. The baseline of the profile Y pixels (304) has an individual baseline value for each profile pixel along the Y axis. The baseline of the capacitive image corresponds to the interference when transcapacitive sensing is performed. The baseline of the capacitive image (302) has an individual baseline value for each image pixel.

One or more embodiments are directed to updating the baseline values when one or more input objects are in the sensing region. One or more embodiments use the baseline updated value determined only from the unmasked region to update the baseline in the masked region. In other words, values in the masked region are not used to determine the baseline update value for the masked region in one or more embodiments.

While the technique described below and shown in FIG. 3 presents updating baseline values in the baselines for the profiles, a similar technique may be applied to updating the baseline values for the baseline of the capacitive image. For example, object locations determined from the profiles may be projected on the image. Further, the masked and unmasked regions may be regions of the image.

Although FIG. 3 shows particular configuration of sensing region, profiles, segments, and regions of interest, the particular configuration may change without departing from the scope of the invention. For example, the size and dimensions of the sensing region, positions and numbers of segments, positions of profiles and regions of interest may be different in various embodiments and executions.

FIGS. 4-7 show flowcharts in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 4:
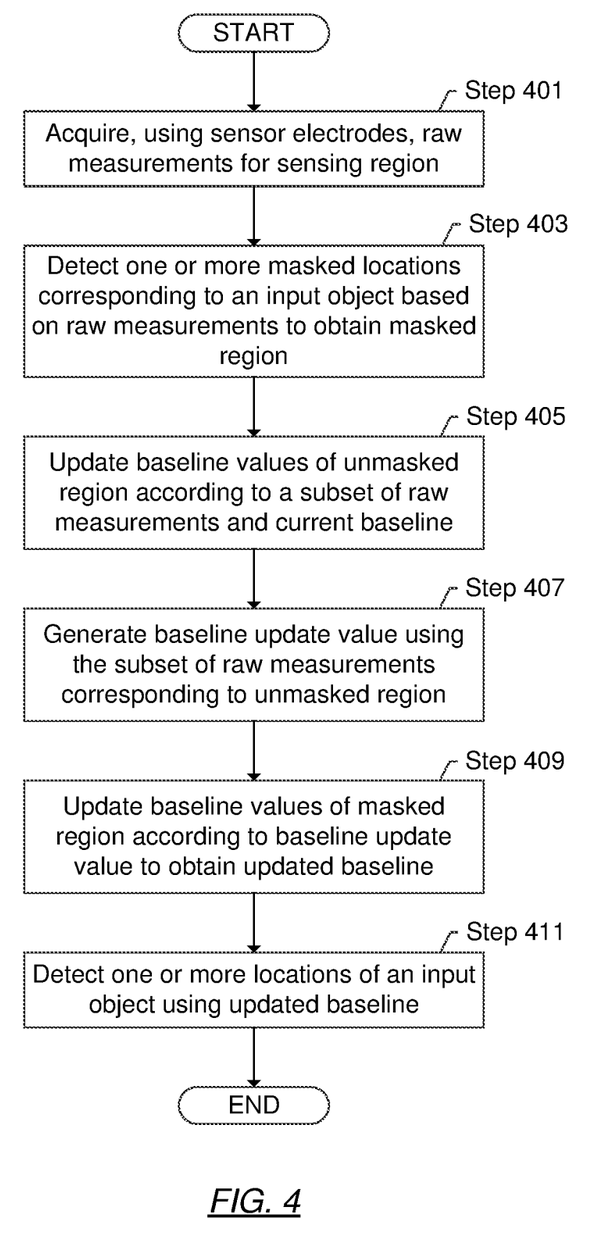
FIG. 4 is an example flowchart for baseline updating in accordance with an embodiment of the disclosure.

FIG. 4 shows a flowchart for updating a baseline and using the updated baseline in accordance with one or more embodiments. In Step 401, using sensor electrodes, raw measurements are acquired for the sensing region. In particular, the sensing circuitry electrically drives the sensor electrodes to obtain raw measurements. For transcapacitive sensing, a first subset of sensor electrodes are driven with first transmitter signals. Further, first resulting signals that are based on the first transmitter signals are received with a second subset of sensor electrodes. In accordance with one or more embodiments of the invention, the subsets of sensor electrodes that transmit the first transmitter signals are different than the subset of receiver electrodes that receive the resulting signals. Further, the resulting signals reflect the transmitter signals, as well as environmental effects and input objects that may be present in the sensing region. Raw measurements are acquired of the sensing region to obtain an image.

For absolute capacitive sensing, sensor electrodes are modulated with absolute capacitive signals, and used to receive resulting signals. The sensor electrodes may be driven with modulated signals. In accordance with one or more embodiments of the invention, the sensor electrodes that are modulated with the absolute capacitive signals are the same as the sensor electrodes that receive the resulting signals. The sensor electrodes that are modulated may be all or a subset of the total sensor electrodes of the input device. Further, the resulting signals reflect the modulated signals, as well as environmental effects and input objects that may be present in the sensing region.

In one or more embodiments, raw measurements are acquired as described above for a sensing frame. A sensing frame is the amount of sensing to obtain a snapshot of the sensing region. In other words, input objects in the snapshot are considered stationary and are for a single point in time.

Sensing frames of raw measurements are consecutively acquired for each single point in time. Each sensing frame may be processed to obtain positional information for the sensing frame. The positional information may include information determined using measurements from multiple sensing frames, such as the velocity of an input object.

In Step 403, one or more masked locations corresponding to a possible input object are detected based on raw measurements to obtain a masked region. The one or more masked locations are possible locations of input objects. In one or more embodiments, a conservative approach is used to detect possible input object locations. In other words, if a location is possible as an input object location, even though unlikely, the location is added to the masked region. Adding locations to the masked region may be performed as described below with reference to FIG. 5.

In Step 405, baseline values of the unmasked region are updated according to a subset of raw measurements and a current baseline. Because the unmasked region corresponds to a region in which an input object is determined not to exist, the raw measurement values of the unmasked region are determined to correspond to background signal. The baseline should account for persistent changes in the background signal, and not for changes that only affect the particular sensing frame. Thus, updating the baseline values for the unmasked region may be performed by incrementing the baseline values in the current baseline to be closer to the corresponding raw measurement values acquired in Step 401 for the unmasked region.

In Step 407, a baseline update value is generated using the subset of raw measurements corresponding to the unmasked region. The baseline update value is a function of the raw measurement values. For example, the baseline update value may be a statistical combination of the raw measurement values. Various statistical combinations may be used without departing from the scope of the invention. In some embodiments, the baseline update value is a single value that is applied across the unmasked region. The single baseline update value may be applied uniformly.

In some embodiments, the baseline update value may be a collection of update values for the masked region. For example, using values from the unmasked region, interpolation/extrapolation may be applied to determine the amount of change for each baseline value in the masked region. The amount of change is the update value for the corresponding baseline value. Various interpolation and/or extrapolation techniques are may be used.

Techniques for generating the baseline update value is described below with reference to FIG. 6.

In Step 409, baseline values of the masked region are updated according to the baseline update value to obtain an updated baseline. In particular, the baseline values that are in the masked region and that are in the current baseline are updated according to an update function by the baseline update value. For example, the update function may be a summation of the corresponding current baseline value and the baseline update value for a particular pixel (i.e., profile pixel, image pixel). The output of the update function is an updated baseline value for the pixel. The updated baseline has updated values for one or more pixels from the current baseline. The updated baseline may include the updated values that are updated in Step 405. As shown, for the purposes of updating the baseline in the masked region, the raw measurement values in the masked region are not used. Thus, actual input objects are not hidden. However, because the baseline is updated, hallucinated input objects are not persistently maintained.

In Step 411, one or more locations of an input object are detected using an updated baseline. In one or more embodiments, raw capacitive measurements are acquired for the next sensing frame. The updated baseline in Step 409 is the current baseline in Step 411 for the next sensing frame. For each pixel (i.e., profile pixel and/or image pixel), the difference between the baseline value in the current baseline and the corresponding raw measurement value is computed to obtain a delta value. Temporal and/or spatial filtering may be performed. Delta values greater than a threshold may be determined to correspond to a possible location of an input object. Segmentation and further computation may be applied to identify the location of an input object from the possible locations. Positional information is determined for the locations of the input objects. The positional information is reported. For example, the positional information may be reported by the processing system to a main processor. As another example, the positional information may be reported from an operating system to an application. Based on the detected input object, or lack thereof in the positional information, the electronic system may be updated.

Figure 5:
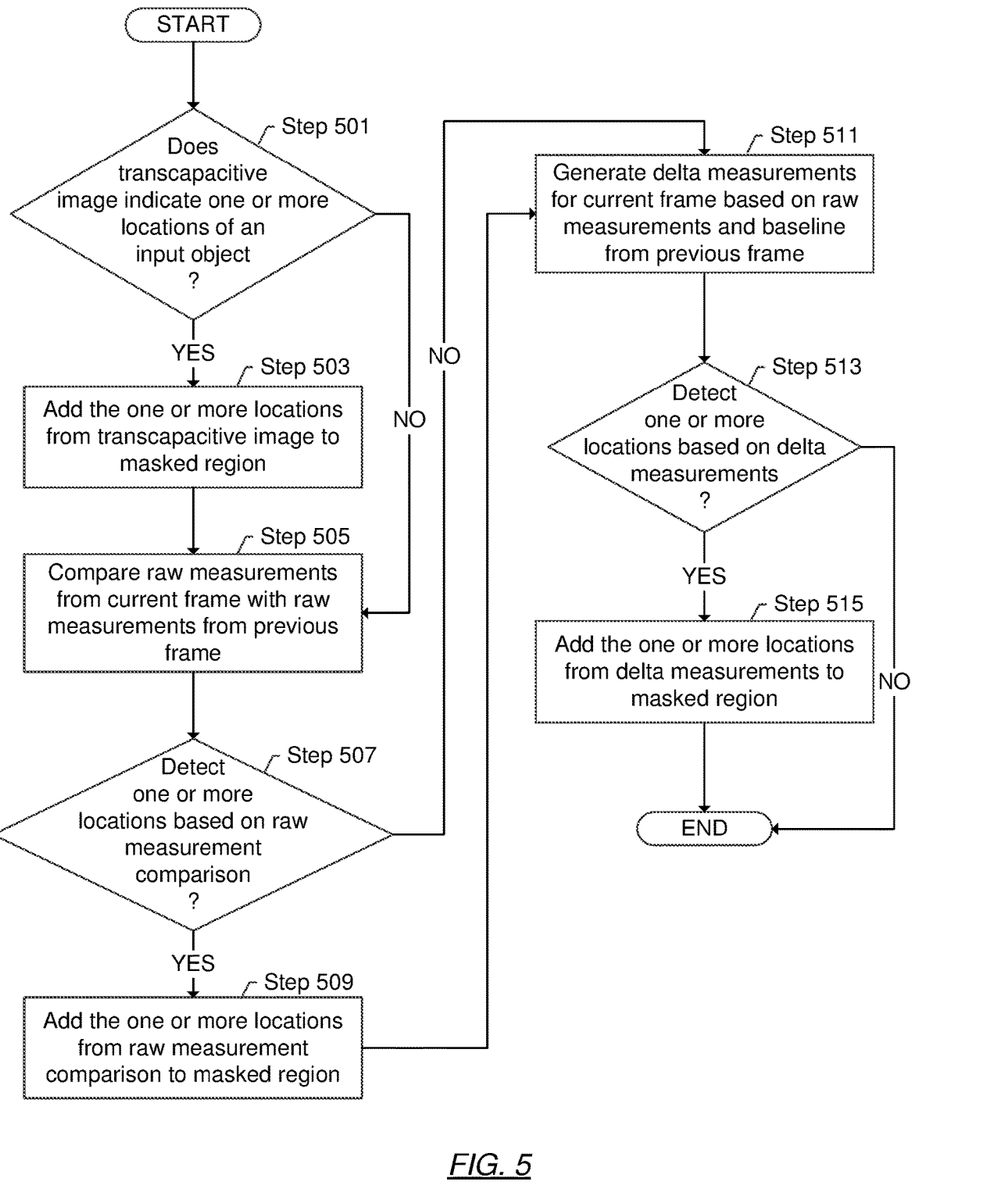
FIG. 5 is an example flowchart for masking in accordance with an embodiment of the disclosure.

FIG. 5 shows a flowchart for adding locations to a masked region in accordance with one or more embodiments. Specifically, FIG. 5 shows a flowchart for adding locations to a masked region of a profile in accordance with one or more embodiments. The profile is the profile for which the baseline is being updated. The technique of FIG. 5 may be performed for both profiles or for a single profile without departing from the scope of the claims.

In Step 501, a determination is made whether the transcapacitive image indicates one or more locations of an input object. The raw measurements acquired in Step 401 of FIG. 4 may include data signal and noise signal. The raw measurements are processed to obtain delta measurements for the transcapacitive image. In particular, for each image pixel in the transcapacitive image, the difference between the raw measurement value acquired for the image pixel and the corresponding baseline value for the image pixel is computed to obtain a delta value for the image pixel. The corresponding baseline value is in the current baseline for the image, which may have been updated in the prior sensing frame. The current baseline is the baseline used for the current sensing frame. Accordingly, the delta value is for a specific image pixel. Temporal and/or spatial filtering may further be applied to the delta values. Delta values greater than a threshold and corresponding to a peak in the delta values, such as shown in FIG. 2, may be determined as a possible location of an input object. The possible location may be the peak and the region surrounding the peak that is greater than a threshold for the purposes of adding the possible location to the masked region. If at least one such possible location exists, then the transcapacitive image is determined to indicate one or more locations of an input object and the flow proceeds to Step 503. If a possible location does not exist, then the flow proceeds to Step 505.

In Step 503, the one or more locations determined from the transcapacitive image are added to the masked region. For the profile, the possible location in the transcapacitive image is projected onto the profile. The profile pixels corresponding to sensor electrodes that obtained the raw measurements of the possible locations are marked as possible locations. FIG. 3 is an example of a projection. Thus, the masked region in the profiles includes the possible locations from the transcapacitive image. Adding locations to the masked region may include adding the identifiers of the pixels to a set of identifiers for the masked region.

Step 503 is performed to make sure that sensor electrodes that are identified, from the transcapacitive image, as possibly affected by an input object are identified as possible locations in the profiles. Thus, raw measurement values of such identified sensor electrodes for the absolute capacitive sensing is identified as being a possible location of an input object and not used to update the corresponding baseline for the profile.

Continuing with FIG. 5, in Step 505, the raw measurements from the current sensing frame are compared with the raw measurements from the previous sensing frame. In one or more embodiments, the raw measurements in the current sensing frame and previous sensing frame that are used are measurements in an absolute capacitive profile. For each profile pixel in the profile, the difference between the raw measurement from the current sensing frame and the corresponding raw measurement from the previous sensing frame is computed to obtain a difference value. The difference value is the amount of change between the raw measurements for consecutive sensing frames.

In Step 507, a determination is made whether one or more locations are detected based on the raw measurement comparison of Step 505. The difference value determined in Step 505 for the pixels is compared against a threshold. If the threshold is satisfied, then the one or more profile pixels having the difference value that satisfied the threshold is detected as one or more locations. In such a scenario, the flow proceeds to Step 509. In Step 509, the one or more locations from the raw measurement comparison that is detected in Step 507 are added to the masked region. If no location satisfies the threshold in Step 507, the flow proceeds to Step 511.

In Step 511, delta measurements for the current frame are generated based on raw measurement values and the baseline values from the previous frame. The raw measurements corresponding to the absolute capacitive sensing acquired in Step 401 of FIG. 4 may include data signal and noise signal. In particular, for each profile pixel in the profile, the difference between the raw measurement value acquired for the profile pixel and the corresponding baseline value for the profile pixel is computed to obtain a delta value for the profile pixel. The corresponding baseline value is in the current baseline for the profile, which may have been updated in the prior sensing frame. The current baseline is the baseline used for the current sensing frame. Accordingly, the delta value is for a specific profile pixel corresponding to a specific location in the profile. Temporal and/or spatial filtering may further be applied to the delta values.

In Step 513, a determination is made whether one or more locations are detected based on the delta measurements. Delta values greater than a threshold and corresponding to a peak in the delta values, such as shown in FIG. 2, may be determined as a possible location of an input object. The possible location may be the peak and the region surrounding the peak that is greater than a threshold for the purposes of adding the possible location to the masked region. If at least one such possible location exists, then the absolute capacitive profile is determined to indicate one or more locations of an input object and the flow proceeds to Step 515. If a possible location does not exist, then the flow proceeds to end in one or more embodiments. Specifically, the baseline may be updated across the sensing region.

In Step 515, the one or more locations from the profile delta measurements are added to the masked region. In particular, the profile pixels corresponding to the locations are added as part of the masked region. Accordingly, the masked region includes locations that may be affected by input object (i.e., may have data signal). The remaining locations that are not in the masked region are in the unmasked region.

Although FIG. 5 describes a technique for identifying a masked region for the profiles, a similar technique may be performed for identifying a masked region for the image. Specifically, locations in the sensing region that are identified from absolute capacitive sensing may be added to the masked region of the image. Further, locations in the sensing region that are identified from transcapacitive sensing may be added to the masked region of the image. Additionally, the difference between the raw measurement values in the images of consecutive sensing frames may be used in Steps 505 and 507 to add locations to masked regions in the image. Accordingly, similar technique may be used to update the baseline of the image in one or more embodiments.

Figure 6:
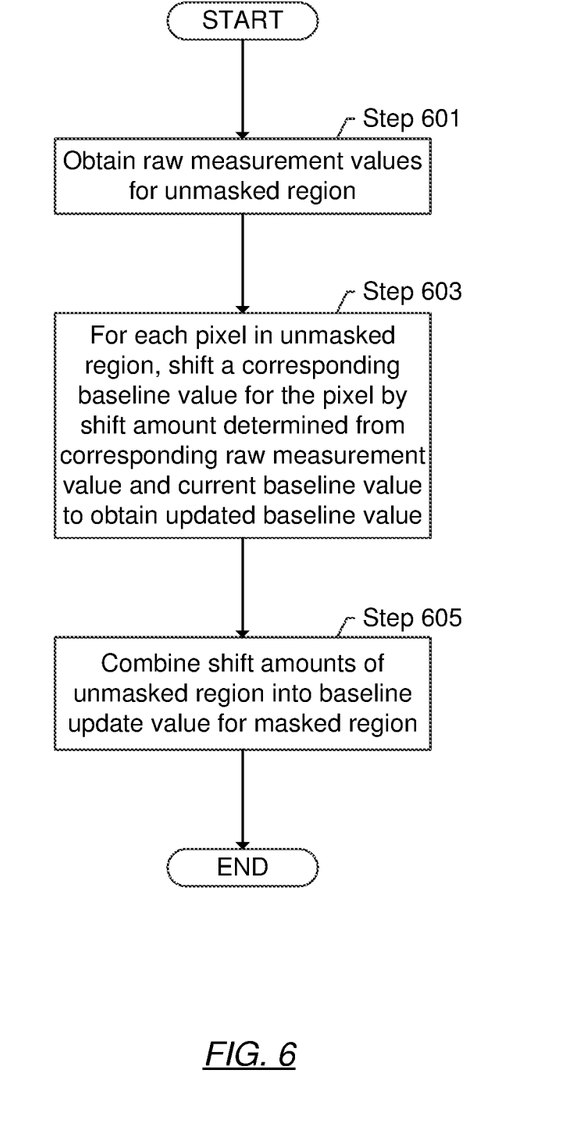
FIG. 6 is an example flowchart for updating baseline values in accordance with an embodiment of the disclosure.

Continuing with the discussion, FIG. 6 shows a flowchart for determining a baseline update value in accordance with one or more embodiments. In Step 601, raw measurement values for the unmasked region are obtained. The raw measurement values are obtained from the sensing as described above with reference to Step 401 of FIG. 4.

In Step 603, for each pixel in the unmasked region, the corresponding baseline value for the pixel is shifted by a shift amount determined from the corresponding raw measurement value and the current baseline value to obtain an updated baseline value. The shift amount is the difference between the updated baseline value and the current baseline value for the pixel. The shift amount is an amount that is less than or equal in magnitude to the difference between the raw measurement value for the pixel and the current baseline value for the pixel. In other words, a blending method may be applied, such as presented below in equation Eq. 1.

$$B(x,n)=\alpha R(x,n)+(1-\alpha)B(x,n-1) \qquad (Eq.\ 1)$$

In equation Eq. 1, alpha is a value between zero and one, x is the pixel, n is the frame number, $R(x,n)$ is the raw measurement value for the pixel x, $B(x,n-1)$ is the current baseline value for the pixel x, and $B(x,n)$ is the updated baseline value. As shown, the greater the alpha, the greater the raw measurement value updates the baseline. An example may be that alpha is 20% and (1-alpha) is 80%.

In Step 605, the shift amounts of the unmasked region are combined into a baseline update value for the masked region. In at least some embodiments, the baseline update value is a statistical combination of the shift amounts of the pixels in the unmasked region. For example, the baseline update value may be the minimum shift amount or the mean shift amount of the pixels in the unmasked region. By way of an example, in equation form, the baseline update value may be determined using equation Eq. 2, or Eq. 3 below.

$$D(n) = \min((B(x,n) - B(x,n-1)) \times (1 - M(x,n))) \qquad (Eq.\ 2)$$

$$D(n) = \frac{\sum_{unmasked\ pixels} ((B(x,n) - B(x,n-1)) \times (1 - M(x,n)))}{\sum_{unmasked\ pixels} (1 - M(x,n))} \qquad (Eq.\ 3)$$

In equation Eq. 2 and Eq. 3, $M(x,n)$ is zero if the pixel x is in the unmasked region and one if the pixel x is in the masked region, x is the pixel, n is the frame number, $B(x,n-1)$ is the current baseline value for the pixel x, $B(x,n)$ is the updated baseline value, and $D(n)$ is the baseline update value. The above are only two functions that may be used to determine the baseline update value. Other functions may be used without departing from the scope of the invention.

As described above, the processing system may manage multiple baseline. The steps of FIG. 6 are performed independently for a baseline in one or more embodiments. The masked and unmasked regions values used correspond only to the baseline being updated. FIG. 6 may be performed independently for each baseline to obtain a corresponding baseline update value for each baseline.

Figure 7:
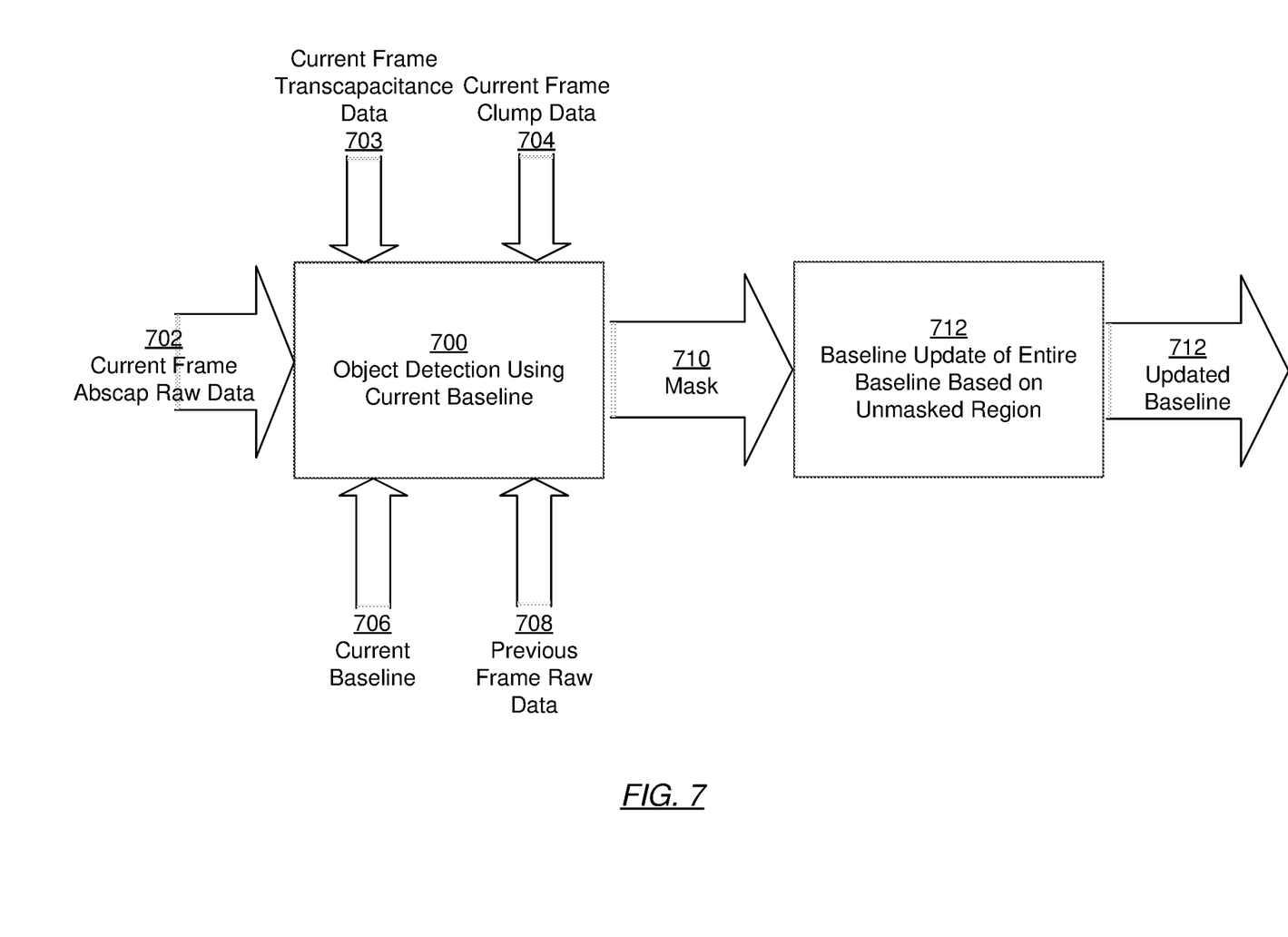
FIG. 7 is an example overview diagram in accordance with an embodiment of the disclosure.

FIG. 7 shows an example diagram in accordance with one or more embodiments. To perform object detection using the current baseline (700), the current frame absolute capacitance raw data (702), the current frame transcapacitance data (703), the current frame clump data (704), the current baseline (706), and the previous frame raw data (708) are used. The possible locations of the input object (700) are used to identify masked region (710). A baseline update of the entire baseline is performed based on the unmasked region (712) to create an updated baseline (714).

Thus, the embodiments and examples set forth herein were presented in order to best explain various embodiments and the particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system comprising:
   a sensor circuitry coupled to a plurality of sensor electrodes, and configured to:
      drive the plurality of sensor electrodes, and
      acquire, from the plurality of sensor electrodes and based on driving the plurality of sensor electrodes, a plurality of resulting signals of a sensing region; and
   a processing circuitry configured to:
      determine a first plurality of raw measurements from the plurality of resulting signals,
      obtain a masked region of the sensing region based on the first plurality of raw measurements, by:
         comparing the first plurality of raw measurements with a second plurality of raw measurements to obtain a comparison result,
         the first plurality of raw measurements obtained for a first sensing frame and the second plurality of raw measurements obtained for a second sensing frame, the second sensing frame preceding the first sensing frame, and
         adding a first mask location to the masked region based on the comparison result indicating that at least one of the first plurality of raw measurements at the first mask location is different from at least one of the second plurality of raw measurements at the first mask location,
      generate a baseline update value using a subset of the first plurality of raw measurements corresponding to an unmasked region of the sensing region, the unmasked region and the masked region being concurrently existing locations in the sensing region,
      update a baseline value of the masked region using the baseline update value to obtain an updated baseline, and
      detect a location of an input object using the updated baseline.

2. The processing system of claim 1, wherein the determination circuitry is further configured to:
   update at least one baseline value of an unmasked region according to a current baseline and the first plurality of raw measurements to create the updated baseline.

3. The processing system of claim 1, wherein the determination circuitry is further configured to:
   determine a second plurality of raw measurements from the plurality of resulting signals, the plurality of resulting signals spanning a least two sensing frames,
   determine, for each corresponding baseline value of at least a subset of baseline values in the updated baseline, a delta value between a raw measurement value in the second plurality of raw measurement values and the corresponding baseline value to obtain a plurality of delta values, and
   detect the location of the input object based on the plurality of delta values satisfying a threshold.

4. The processing system of claim 1, wherein the determination module is further configured to:
   determine whether a transcapacitive image obtained from the first plurality of raw measurements indicates a location of the input object, and
   add the location of the input object to the masked region as a second mask location.

5. The processing system of claim 1, wherein the determination module is further configured to:
   generate a plurality of delta measurements based on the first plurality of raw measurements and a current baseline, and
   add a second mask location to the masked region based on the plurality of delta measurements.

6. The processing system of claim 1, wherein the determination module is further configured to:
   obtain a subset of the plurality of raw measurements, the subset of the plurality of raw measurements corresponding to the unmasked region, and
   for each pixel in the unmasked region, shift a corresponding baseline value for the pixel by a shift amount determined from a corresponding raw measurement and a current baseline value to obtain an updated baseline value in the updated baseline.

7. The processing system of claim 1, wherein the determination module is further configured to:
   determine a shift amount for each of a plurality of pixels in the unmasked region to obtain a plurality of shift amounts, and
   combine the plurality of shift amounts into the baseline update value.

8. The processing system of claim 1, wherein combining the plurality of shift amounts is averaging the plurality of shift amounts.

9. A method comprising:
   determining a first plurality of raw measurements from a plurality of resulting signals acquired for a sensing region;
   obtaining a masked region of the sensing region based on the first plurality of raw measurements, by:
      comparing the first plurality of raw measurements with a second plurality of raw measurements to obtain a comparison result,
      the first plurality of raw measurements obtained for a first sensing frame and the second plurality of raw measurements obtained for a second sensing frame, the second sensing frame preceding the first sensing frame, and
      adding a first mask location to the masked region based on the comparison result indicating that at least one of the first plurality of raw measurements at the first mask location is different from at least one of the second plurality of raw measurements at the first mask location;

generating a baseline update value using a subset of the first plurality of raw measurements corresponding to an unmasked region of the sensing region, the unmasked region and the masked region are concurrently existing locations in the sensing region;

updating a baseline value of the masked region using the baseline update value to obtain an updated baseline; and detecting a location of an input object using the updated baseline.

10. The method of claim 9, further comprising:
determining whether a transcapacitive image obtained from the first plurality of raw measurements indicates a location of the input object, and
add the location of the input object to the masked region as a second mask location.

11. The method of claim 9, further comprising:
generating a plurality of delta measurements based on the first plurality of raw measurements and a current baseline, and
adding a second mask location to the masked region based on the plurality of delta measurements.

12. The method of claim 9, further comprising:
determining a shift amount for each of a plurality of pixels in the unmasked region to obtain a plurality of shift amounts, and
combining the plurality of shift amounts into the baseline update value.

13. An input device comprising:
a plurality of sensor electrodes; and
a processing system operatively connected to the sensor electrodes and configured to:
drive the plurality of sensor electrodes,
acquire, from the plurality of sensor electrodes and based on driving the plurality of sensor electrodes, a plurality of resulting signals of a sensing region,
determine a first plurality of raw measurements from the plurality of resulting signals,
obtain a masked region of the sensing region based on the first plurality of raw measurements, by:
compare the first plurality of raw measurements with a second plurality of raw measurements to obtain a comparison result,
the first plurality of raw measurements obtained for a first sensing frame and the second plurality of raw measurements obtained for a second sensing frame, the second sensing frame preceding the first sensing frame, and
add a first mask location to the masked region based on the comparison result indicating that at least one of the first plurality of raw measurements at the first mask location is different from at least one of the second plurality of raw measurements at the first mask location,
generate a baseline update value using a subset of the first plurality of raw measurements corresponding to an unmasked region of the sensing region, the unmasked region and the masked region are concurrently existing locations in the sensing region,
update a baseline value of the masked region using the baseline update value to obtain an updated baseline, and
detect a location of an input object using the updated baseline.

14. The input device of claim 13, wherein the processing system is further configured to:
determine whether a transcapacitive image obtained from the first plurality of raw measurements indicates a location of the input object, and
add the location of the input object to the masked region as a second mask location.

15. The input device of claim 13, wherein the processing system is further configured to:
generate a plurality of delta measurements based on the first plurality of raw measurements and a current baseline, and
add a second mask location to the masked region based on the plurality of delta measurements.

16. The input device of claim 13, wherein the processing system is further configured to:
obtain a subset of the plurality of raw measurements, the subset of the plurality of raw measurements corresponding to the unmasked region, and
for each pixel in the unmasked region, shift a corresponding baseline value for the pixel by a shift amount determined from a corresponding raw measurement and a current baseline value to obtain an updated baseline value in the updated baseline.

17. The input device of claim 13, wherein the processing system is further configured to:
determine a shift amount for each of a plurality of pixels in the unmasked region to obtain a plurality of shift amounts, and
combine the plurality of shift amounts into the baseline update value.

* * * * *

UNITED STATES PATENT AND TRADEMARK OFFICE
CERTIFICATE OF CORRECTION

PATENT NO. : 10,795,518 B2
APPLICATION NO. : 16/174843
DATED : October 6, 2020
INVENTOR(S) : Katherine Kuan et al.

Page 1 of 1

It is certified that error appears in the above-identified patent and that said Letters Patent is hereby corrected as shown below:

In the Claims

Claim 3, Column 18, Line 8, the word "a" should read -- at --.

Claim 10, Column 19, at the beginning of Line 18, the word "add" should read -- adding --.

Claim 13, Column 19, at the beginning of Line 44, the word "compare" should read -- comparing --.

Claim 13, Column 20, at the beginning of Line 3, the word "add" should read -- adding --.

Signed and Sealed this
Twelfth Day of January, 2021

Andrei Iancu
*Director of the United States Patent and Trademark Office*